US012641110B2

(12) United States Patent (10) Patent No.: US 12,641,110 B2
Belgi et al. (45) Date of Patent: May 26, 2026

(54) AUTOMATICALLY INVESTIGATING SECURITY INCIDENTS AND GENERATING SECURITY INCIDENT REPORTS USING A LARGE LANGUAGE MODEL (LLM)

(71) Applicant: VARONIS SYSTEMS, INC., New York, NY (US)

(72) Inventors: Amir Belgi, Ra'anana (IL); Ron Sne, Atlit (IL); John Eugene Neystadt, Kfar Saba (IL); Lior Chen, Tel Mond (IL)

(73) Assignee: VARONIS SYSTEMS, INC., New York, NY (US)

( * ) Notice: Subject to any disclaimer, the term of this patent is extended or adjusted under 35 U.S.C. 154(b) by 154 days.

(21) Appl. No.: 18/440,980

(22) Filed: Feb. 14, 2024

(65) Prior Publication Data

US 2025/0260707 A1 Aug. 14, 2025

(51) Int. Cl.
H04L 9/40 (2022.01)
G06N 5/02 (2023.01)
(52) U.S. Cl.
CPC ........... H04L 63/1433 (2013.01); G06N 5/02 (2013.01)
(58) Field of Classification Search
None
See application file for complete search history.

(56) References Cited

U.S. PATENT DOCUMENTS

2002/0107852 A1* 8/2002 Oblinger ............... G06F 16/337
707/999.005

2022/0114201 A1* 4/2022 Barbour ............. G06F 16/3347
2023/0113621 A1* 4/2023 Griffin .................... H04L 63/20
726/23
2023/0396635 A1* 12/2023 Hebbagodi ......... H04L 63/1466

FOREIGN PATENT DOCUMENTS

WO 2017/037444 A1 3/2017

OTHER PUBLICATIONS

International Search Report in PCT/IB2025/051278, dated Apr. 21, 2025.
Written Opinion of the International Searching Authority in PCT/IB2025/051278, dated Apr. 21, 2025.
Xiaoxia Liu et al., "Prompting Frameworks for Large Language Models: A Survey", dated Nov. 21, 2023, Available at: arxiv.org/abs/2311.12785.

* cited by examiner

*Primary Examiner* — Cai Y Chen
(74) *Attorney, Agent, or Firm* — AlphaPatent Associates Ltd.; Daniel J. Swirsky

(57) ABSTRACT

Automatically investigating security incidents and generating security incident reports using a Large Language Model (LLM). A computerized system receives an incoming Security Alert Message pertaining to a possible security-related incident. The system automatically feeds into the LLM at least: the content of the Security Alert Message; the metadata of the Security Alert Message; context information describing a security domain; and organization context information pertaining to users and machines of that organization. The system automatically prompts the LLM to automatically investigate the Security Alert Message and to automatically generate a detailed Incident Report pertaining to the Security Alert Message.

10 Claims, 4 Drawing Sheets

AUTOMATICALLY INVESTIGATING SECURITY INCIDENTS AND GENERATING SECURITY INCIDENT REPORTS USING A LARGE LANGUAGE MODEL (LLM)

FIELD

Some embodiments are related to the field of computerized systems.

BACKGROUND

A large corporation, organizations, or other entity may have thousands of team-members who utilize computing devices for various purposes; for example, to send and receive electronic mail, to engage in video calls, to browse the Internet, to compose documents, to access data repositories, or the like.

An end-user of an electronic device, and particularly a network administrator, may receive hundreds of incoming messages per day, from numerous recipients, with regard to a variety of topics.

SUMMARY

Some embodiments include systems, devices, and methods for automatically investigating and probing security alerts, and for automatically generating security alert reports or summaries or insights, by utilizing one or more Large Language Models (LLMs) that operate innovatively with a suitable database.

Some embodiments provide systems and methods for automatically investigating security incidents and generating security incident reports using a Large Language Model (LLM). For example, a computerized system receives an incoming Security Alert Message pertaining to a possible security-related incident. The system automatically feeds into the LLM at least: the content of the Security Alert Message; the metadata of the Security Alert Message; context information describing a security domain; and organization context information pertaining to users and machines of that organization. The system automatically prompts the LLM to automatically investigate the Security Alert Message and to automatically generate a detailed Incident Report pertaining to the Security Alert Message.

Some embodiments may provide other and/or additional benefits and/or advantages.

DETAILED DESCRIPTION OF SOME DEMONSTRATIVE EMBODIMENTS

Figure 1:
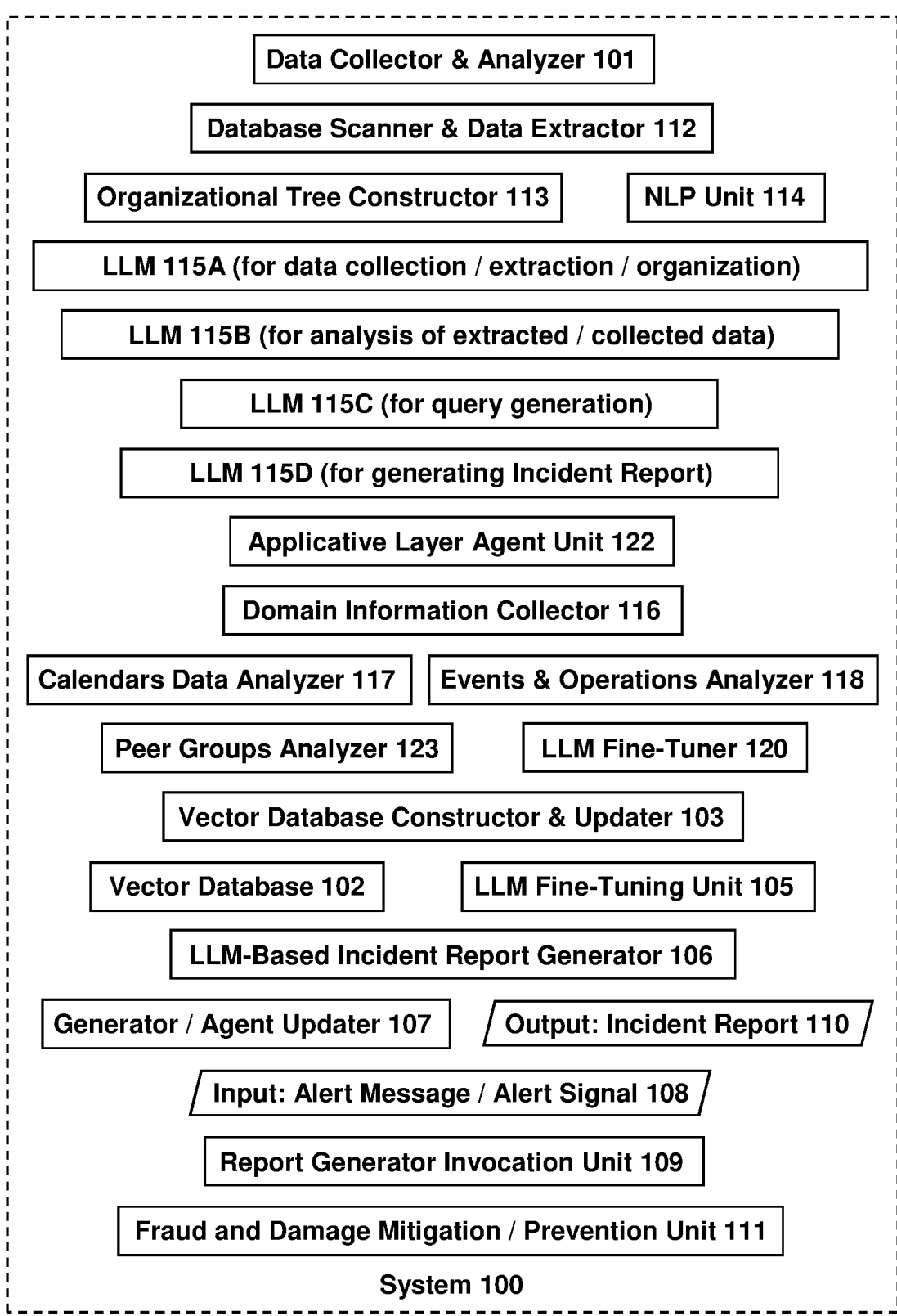
FIG. 1 is a schematic block-diagram illustration of a system, in accordance with some demonstrative embodiments.

The terms "attack" or "cyber-attack" as used herein may include, for example, an operation or code or malware or virus or other element that performs (or attempts to perform) unauthorized activity on an electronic device or via an electronic device, and/or that performs (or attempts to perform) an unauthorized operation with regard to data and/or code that is stored on an electronic device or that is accessible via an electronic device; and/or that performs (or attempts to perform) one or more operations that are unauthorized or illegal or fraudulent (e.g., obtaining a user's login credential into a computerized service; performing an unauthorized banking transaction or electronic commerce transaction; copying or encrypting or modifying data or code of a user; causing an electronic device to perform operations that are unauthorized the owner or by the authorized user of the electronic device); or the like.

The Applicant has realized that a user of an electronic device may receive numerous incoming alert messages, such as email messages and/or SMS text messages, that alert the user to a possible attack that a system or a third-party, or the electronic device of the end-user, estimates to be an attack or a part of an attack or related to a possible attack. The Applicant has realized that many users lack the time or the knowledge to review such incoming alert messages, or to distinguish among, for example: (i) a correct alert message that is correct and should be acted upon, or (ii) a false-positive alert message that incorrectly estimates an operation as being attack-related while it is not actually attack-related, or (iii) a correct alert message that indeed reflects an attack-related operation but need not be acted upon (e.g., since the attack was already blocked, or the attack cannot be completed because of a protection mechanism), or (iv) an alert message that should be evaluated by using a larger context that takes into account data and/or meta-data related to the suspicious activity and/or related to previous (or subsequent) alert messages or suspicious operations.

The Applicant has further realized that an administrator or manager of an organization or corporation or enterprise having thousands of end-users, may receive hundreds of such alert messages per day or per week, with regard to legitimate and non-legitimate activities that were performed (or were associated with) a variety of electronic devices of such numerous end-users. Such administrator or manager, realized the Applicant, may lack the time and/or the knowledge to correctly evaluate such incoming alert messages, and to decide which alerts are correct and which are false-positive errors, or to evaluate which correct alert message should be acted upon and which other correct alert message can be ignored as a protection mechanism is in place, or to evaluate which protection mechanism to apply to a particular alert message, or to evaluate an alert message by taking into account data and/or meta-data that needs to be collected and investigated from a current suspicious activity as well as from previous and/or subsequent activities of the same user or of other user or of the same electronic device or of other electronic devices.

The Applicant has realized that it may be beneficial to provide automated systems and methods that can autonomously review and investigate such incoming alert messages or alert signals, or such already-generated or received alert messages or alert signals; and that can automatically and autonomously collect or gather data and/or meta-data, including from other/previous/subsequent alert messages or incidents, and/or from the same electronic device/user account and/or from other electronic devices/user accounts in the same organization/enterprise; and to automatically and autonomously generate an Incident Report, written in a natural language (e.g., English) that the user or the administrator can read and understand, providing the investigation results as well as one or more mitigation operations that may or can or should be performed. In some embodiments, such automatically-generated Incident Report may further be accompanied by a generated code or code-portion, or by a generated signal or message, that trigger or cause the automatic invocation of such mitigation operations (e.g., quarantining of an email message; disconnecting a device from a network; forcing a password reset for a particular account; forcing a remote log-off or log-out for a particular account; triggering a request to perform a secondary or additional authentication or log-in; or the like).

Some embodiments further operate to construct such Incident Report by utilizing one or more of: (A) a database that represents data and meta-data about the organization or enterprise and/or about its network(s) and/or about its electronic devices and/or its users and/or its user accounts; (B) data indicating relationship among the entities or items mentioned above (e.g., which device has, or does not have, access to which organizational resource; which device is associated with, or is not associated with, which particular user/s); (C) data indicating past activity and/or subsequent activity (e.g., performed before, or after, the suspicious activity was detected and/or alerted) among two or more of the above-mentioned entities and/or items; such as, data indicating that user A typically uses Device B or Device C, and typically receives legitimate emails from External Sender E that typically sends CC also to User F and user G in this organization; (D) data of or about previous alerts and/or subsequent alerts and/or concurrent alerts, that are triggered with regard to the same user/device as well as with regard to other users/devices/resources of the same organization; (E) data indicating known attacks, known attack vectors, known attack surfaces, known vulnerabilities, known attack chains, and known/suggested/mandatory/recommended attack protection mechanisms/attack blocking mechanisms/attack stopping mechanisms/attack mitigation mechanisms; (F) data describing groups of users or "peer groups" that typically work together and/or communicate together in the organization, and/or data related to the typical communication patterns among members of such peer group and/or between such peer group and external senders/external recipients; (G) one or more LLMs that are prompted to query a general knowledgebase and/or an organization-specific knowledgebase, and that are prompted to generate the content portions that together form the automated Incident Report that the system generates; (H) a set or database of code-portions or mitigation tools or mitigation processes, that can be selectively invoked or triggered or activated, in an entirely automated manner or in a semi-automated manner (e.g., the mitigation operation is activated bur requires a user's approval to be fully performed), or a pool or bank of such pre-defined attack-mitigation/attack-blocking/attack-protection operations that can be automatically selected and activated/invoked/triggered by a human or automatically by the system.

Some embodiments may operate in conjunction with, or may be combined with, or may be associated with, a product suite that is configured to detect threats and/or attacks based on one or more signals, including pre-defined/real-time/behavioral threat models, real-time analytics, user behavior analytics, and/or as part of (or operating in conjunction with) an Endpoint Detection and Response (EDR) tool and/or a Managed Detection and Response (MDR) tool and/or an Extended Detection and Response (XDR) tool. Some embodiments, may autonomously classify an incoming alert or a generated alert, as a false-positive or as a true-positive; and/or may perform sub-classification of a true-positive alert into one of several sub-classifications, such as, a true-positive alert that was already mitigated or stopped, or a true-positive alert that is estimated to be benign since it cannot proceed to inflict any damage or since a mitigation/blocking/protection mechanism is already in place, or a true-positive alert that should be acted upon by a human, or a true-positive alert that should trigger an automatic deployment/invocation/activation of an automated protection mechanism/mitigation mechanism, or a true-positive alert that should be placed on a "continuously monitor" list and should be moved into an "actual threat" if one or more particular conditions hold true and/or if one or more other alerts are generated or are received; or other sub-types or sub-classes of alerts. Some embodiments further leverage or advance the system's capabilities from analyzing a single/isolated alert, to detecting and analyzing and investigating an entire attack chain, and/or identifying distinct or distant or scattered alerts or events or activities or data-items that when taken in the aggregate or in the relevant context indicate a single attack or a single attack chain (or, indicate a set or batch or group of multiple attacks carried out in parallel or in series); and/or generating and providing customer-specific/organization-specific/user-specific recommendations to prevent the attacker from continuing the attack, or for stopping/blocking/mitigating the attack, or for automatically performing or triggering or invoking such protection/mitigation operations in an automated manner.

In accordance with some embodiments, a "Threat Model" (or briefly, a "Model") is a module or component or unit in a threat detection and mitigation system, that is configured to analyze signals and data and to detect an attack or an attempted attack or a security threat or a vulnerability, or to generate a determination or an estimation (optionally accompanied by a confidence score or confidence level) that a particular operation or activity is part of an attack or an attack-chain. For example, a Threat Model may indicate that each of the following is an attack or an attempted attack, or has a reasonable probability to be an attack: (i) at least N files that were pre-defined as "sensitive" or "confidential" or has having "privileged access", were downloaded from a cloud-based repository and/or were copied to a local computing device and/or were copied to an external storage unit and/or were sent out by email to a new (never before seen) recipient; (ii) at least M files were deleted from an organizational repository within T seconds, particularly if the deletion was initiated or performed by a user or by an end-user device that typically does not delete files and/or that does not have authorization or privileges to delete files; (iii) a user account was accessed from a foreign country, or from a new geo-location that was never before seen for accessing this user account, or from which a log-in was not performed in the past T days; (iv) at least P failed attempts were made, in the past T seconds, to log-in into a particular user account of the organization, or to log-in into a plurality of user accounts of the organization, and particularly of those failed attempts originated from a single Internet Protocol (IP) address, and particularly if that single IP address is external to the organization and/or is geo-located in a foreign country; (v) an incoming email or SMS message is requesting an end-user in the organization to urgently transfer funds to an alleged vendor/provider. Other Threat Model scenarios may be defined, using pre-defined rules, conditions, threshold values, IP address data, timing data, and/or other parameters.

The term "Alert" as used herein, as well as a "generated alert" or "incoming alert" or similar terms, relate to a message or signal that indicates a particular detection/ estimation/determination that was generated by a Threat Model. For example, an Alert may be an incoming email message indicating that a particular other email message appears to be fraudulent and was quarantined; or, an Alert may be a message to a system administrator that at least N files were copied/deleted/encrypted in the past T seconds by a particular user or device; or, an Alert may be a message to a system administrator or to an end-user that a particular user account was accessed from a foreign country, or that one or more log-in attempts were performed towards a particular user account from a foreign country; or, an Alert may be a message to a system administrator that at least N failed log-in attempts were performed, in the past T seconds, towards a particular user-account or device, from a single IP address or from a plurality of IP addresses; or the like.

The term "Attack Chain" (or "kill chain") as used herein may include a series or set of steps that are typically parts of an attack. An attack chain may include some, or most, or all, of the following steps: Reconnaissance; Weaponization; Delivery; Exploitation; Installation; Command and Control (C2 or C&C); Action on Objective; or the like. An attack chain may include, for example, scanning of ports or devices of a network; identifying a weak or vulnerable component of the network; infiltrating the network via that weak or vulnerable component, such as by transporting a malware payload therethrough; subsequently, activating or triggering that malware payload to operate, to perform unauthorized operation, and optionally to exfiltrate or send-out privileged data, documents, files, log-in details or user credentials, virtual assets/digital assets (e.g., tokens, encryption keys, crypto-currency); or the like.

The term "Attack Knowledgebase" as used herein may include the MITRE framework or the MITRE ATT&ACK framework, or other globally-accessible knowledgebase or proprietary knowledgebase or database or matrix of known attacks and/or attack chains and/or attack vectors and/or attack surfaces and/or attack techniques and/or vulnerabilities and/or adversary tactics. Such attack knowledgebase may optionally include attacks or attack-components which may be grouped into categories such as, for example: (A) Reconnaissance, probing and/or scanning and/or gathering information to plan future operations and/or to identify weak points or vulnerabilities of a target organization or a target network; (B) Resource Development, preparing and/or configuring and/or modifying resources for the main attack operations; (C) Initial Access, penetrating or getting into the target network, or causing a malware code-portion to be installed within the target network (or, externally to the target network but with the capability to penetrate into or affect the target network); (D) Execution, running the malicious code; (E) Persistence, maintaining foothold after getting the initial access; (G) Privilege Escalation, gaining higher-level permissions or access privileges; (H) Defense Evasion, avoiding detection, performing operations to conceal the fact that the network was penetrated or that organizational resources were compromised; (I) Credential Access, stealing or copying account names/usernames, passwords, PINs, log-in credentials; (J) Discovery, gaining additional knowledge about the target system and its internal network and components; (K) Lateral Movement, advancing or moving through/within the target network, such as from a first device (in which the initial penetration occurred) to other device/s; (L) Collection, gathering and collecting valuable data/confidential data or particular items-of-interest/documents-of-interest; (M) Command and Control (C&C or C2), communicating with compromised systems to control them, and/or turning a compromised device into a malware-propagating device, to further infect other devices, to participate in Distributed Denial-of-Service (D-DOS) attacks, or to otherwise inflict damage via other components; (N) Exfiltration, transferring the stolen data to the attacker's device/server/control unit; (O) Impact, further performing operations for manipulating, interrupting, damaging, modifying, stealing, copying, deleting, encrypting, and/or destroying systems and/or data.

In some embodiments, a "Threat Model Metadata" indicates or includes metadata that is associated with a Threat Model; for example, as non-limiting examples: (a) Model Name (e.g., "Extract-Gmail-Password"; (b) Model Description (e.g., a textual description of the goals that the Threat attempts to achieve, and/or the operations that it typically performs, and/or the vulnerabilities that it typically exploits); (c) the Step in the attack chain (e.g., the reconnaissance step, the infiltration step, the exfiltration of data); (d) the relevant/supported/target platforms or devices or services or applications (e.g., Windows; Azure Active Directory; Google Drive; SharePoint Online).

A demonstrative example of Threat Model Metadata can be as follows. (a) Model Name: Password-spraying attack from an external source. (b) Model Description: An activity was detected where multiple existing users failed to authenticate from a single external IP address; an attacker who manages to gain access to an organization's login interface may try to guess valid user accounts using common passwords. (c) Step in the attack chain: Reconnaissance. (d) Supported/Targeted Platforms: Azure Active Directory (AD).

The Applicant has realized that an organization having one or more threat protection system(s) and/or threat detection system(s), often receive a large number of alert per day or per week. Alerts are generated by multiple systems; for example, by a rules engine, a user behavior analytics alert engine, an email scanning tool, a file scanning tool, a malware scanning tool, or the like. The Applicant has realized that investigating and analyzing an incoming alert is often complex, time consuming, effort consuming, error prone; and/or may require security domain expertise, which many users/organizations do not necessarily have. Moreover, realized the Applicant, as multiple alerts are generated over time, tracking a particular attack throughout the different stages of an attack chain becomes difficult. The difficulties arise, realized the Applicant, (I) since there are numerous alerts, and the number of possible subsets of alerts increases non-linearly as the number of alerts increases; and/or (II) since the numerous alerts are spread over time, sometimes across different days or different weeks or even over months; such that it is difficult to locate the overall context of a particular alert during its investigation, as it may be related to another alert that was generated a month prior regarding a different user account in the organization; and a human investigator may not remember the previous alert, or may not make the connection among such alerts, or may not even be aware of such previous alert since each of the related alerts might be analyzed by different team-members.

The Applicant has realized that given a newly generated alert, it becomes difficult and sometimes impossible for a human to answer—at all, or efficiently, or in time—questions such as: (a) What previous alerts in the organization are related to the current alert, or are possibly part of a common attack chain? (b) What are the possible/anticipated/typical next steps of an attacker that performed the activity that is the subject of the current alert? (c) How can the organization prevent/block/stop the attacker from continuing the attack, or how can the attack or the damage be mitigated rapidly and efficiently? (d) Is a particular alert indeed correct (true positive), or is it a false alarm or a false-negative error? (e) For a particular alert that is estimated to be correct (true positive), it is an isolated attack, or is it part of an attack chain, and to which specific attack chain(s) can this alert belong? (f) For a particular alert, what are the suitable/relevant/efficient/available operations that can be invoked, manually and/or automatically, for mitigation/protection?

Some embodiments operate to turn an alert, or to group a plurality of discrete alerts, into an Incident, for which an Incident Investigation Report (IIR) is automatically generated. An incident can be viewed as a series or set of related alerts, that occur with regard to the organization over a period of time (e.g., days, weeks, or even months). Each of these alerts, when viewed individually, might seem insignificant or benign. However, when these alerts are grouped or correlated or analyzed together, they may indicate a larger, more serious, security event that poses an actual risk to the organization. For example, the plurality of scattered alerts may correspond to an attack chain or a prolonged attack, a breach, or a complex multi-stage intrusion. The system operates to group and correlate those alerts, and to automatically determine a broader context and to generate insights with regard to what is truly happening.

Reference is made to FIG. 1, which is a schematic block-diagram illustration of a system 100, in accordance with some demonstrative embodiments. System 100 and/or its components may be constructed or configured to automatically perform a computerized method or a computerized process, which may include the following demonstrative steps. (A) collecting data, such as by a Data Collector & Analyzer 101; (B) constructing/updating a Vector Database 102, such as by a Vector Database Constructor & Updater 103; (C) fine-tuning/configuring/modifying/updating a Large Language Model (LLM), such as by an LLM Fine-Tuning Unit 105; (D) constructing/configuring/modifying/updating an Applicative Layer Agent Unit 122 which operates as an Incident Report Generator 106 (e.g., which may also be referred to as an Agent Unit or Agent Module), such as by a Generator/Agent Updating Unit 107 or an Agent, resulting in an up-to-date Applicative Layer Agent Unit 122 or Incident Report Generator 106 that is adapted to automatically generate an Incident Report based on at least one incoming alert message or incoming alert signal; (E) Upon reception of an incoming alert message or incoming alert signal, invoking the Applicative Layer Agent Unit 122 or the Incident Report Generator 106 to automatically generate an Incident Report. For example, an Alert (message or signal) 108 is generated and/or is received (e.g., from an email protection module, from a web browsing module, from a banking application or service, from an electronic commerce application or service, from an Operating System, from a firewall component, from an anti-virus or anti-malware unit, from a third party, or the like); and a Report Generator Invocation Unit 109 receives the Alert 108 or intercepts the Alert 108, or receives a copy of that Alert, and transfers that Alert 108 (or its copy), and optionally alert-related data or metadata to the Applicative Layer Agent Unit 122 (implemented as Incident Report Generator 106), which analyzes the specific Alert 108 and automatically generates an Incident Report 110. Optionally, the Incident Report 110 may be sent or transported or transferred or copied to one or more pre-defined recipients (e.g., a system administrator; an Information Technology (IT) department; an IT security department; a fraud department) and/or to one or more components. Optionally, a Fraud and Damage Mitigation/Prevention Unit 111 may receive a copy of the Incident Report 110, and may automatically parse it and/or may be triggered by its content (e.g., based on particular keywords or code-portions or commands or strings or signals that may be embedded in the Incident Report 111) to perform one or more fraud and damage mitigation/prevention operations or processes.

The step of collecting data may include, for example, operations of extracting and/or collecting and/or deducing data (e.g., using a Database Scanner & Data Extractor 112) from user identity databases or providers, user reputation database or providers, sender reputation database or providers, email address reputation databases or providers, Internet Protocol (IP) address databases or providers, a Customer Relationship Management (CRM) system or application, a Supply Chain Management (SCM) system or application, an Enterprise Resource Planning (ERP) system or application, and/or other information sources; including, but not limited to, scanning or searching any available internal (in-company) databases and/or external databases and/or private databases and/or public databases and/or proprietary databases; Microsoft Active Directory (AD), Azure Active Directory (AAD), Okta databases, Salesforce databases, Hubspot databases, Microsoft Dynamics 365, a formal or informal Organizational Directory (e.g., maintained or provided by Human Resources (HR) or by other entity), formal or informal list(s) of Contacts that each user or user-account in the organization maintains (e.g., extracted or obtained from an email application or an email account of each user, and/or from electronic devices utilized by each user), or the like.

In this step, users' information is extracted, such as (per each user) its name, its username, its Organizational Unit (OU), organizational department (e.g., legal, marketing, operations), organizational team-identifier, organizational title or role (e.g., CFO, CTO, PM, developer, assistant), email address, direct manager(s), indirect manager(s), known subordinates, and/or other data. This step may further include deducing or determining group(s) within the organization, and determining which users are members of which group(s). This step may further include constructing an Organizational Structure Tree, that reflects the information that was collected and/or extracted and/or deduced and/or determined as mentioned above; such as, by an Organizational Tree Constructor 113 that performs this automatically based on pre-defined rules and/or lookup table(s).

In some embodiments, optionally, a Natural Language Processing (NLP) Unit 114, and/or a textual analysis unit, and/or a contextual analysis unit, and/or a Large Language Model (LLM) 115A, may be utilized in order to deduce or determine connections and/or relations among users; for example, by determining a connection or a relation between "Adam Smith, manager of the Smith Group" and "Jane Brown, member in the Smith Group" and "David Lewis, assistant in the Smith Group", and/or by determining that Adam has a supervisory role and David has a subordinate role, or the like. In some embodiments, optionally, a pre-defined lookup table may be utilized to indicate typical relations among users or among particular roles; for example, indicating that typically, a user whose organizational role is "Accounts Receivable assistant" is a subordinate (directly or indirectly) of a person whose organizational role is "CFO"; or that indicate that a person whose email signature is "X, administrative assistant to Y" is a direct subordinate of Y; or the like.

The step of collecting data may further include, for example: (i) collection and analysis of domain information or domain-related information, via a Domain Information Collector 116; (ii) analysis of calendar data (e.g., events data, meetings data, scheduled items data, past calendar events data, future calendar events data, recurring calendar events data) of users in the organization, or from user accounts or from user devices, such as by a Calendars Data Collector & Analyzer 117; (iii) analysis of events log and operations logs (e.g., via an Events & Operations Analyzer 118) that are kept for all the operations performed in the organizational system/network/servers/repositories, such as, determining that User A typically accesses Repository B on a daily basis, and never accesses Repository C; or, determining that User A typically sends emails to User B, on a weekly basis, but never to User D; or, determining that User A and User E have been in the same organizational meeting at least one time in the past 12 months, whereas User A and User F have not; or the like).

The step of collecting data may further include, for example, determining or establishing or deducing Peer Groups for users in the organization, and/or determining membership or association of particular user(s) with particular Peer Group(s); for example, by a Peer Groups Analyzer 123 that is configured for determining that users A and B and C belong to a first Peer Group, and that users C and D and E and F belong to a second, different, Peer Group. Some embodiments may detect or determine or define Peer Groups in the organization, and/or may associate a particular user or user-account with one or more particular Peer Groups in the organization, by utilizing one or more components, operations and/or methods that are described in U.S. Pat. Nos. 7,606,801 and/or 7,555,482 and/or 8,438,611 and/or patent U.S. Pat. No. 9,641,334 and/or patent U.S. Pat. No. 9,870,480, all of which are hereby incorporated by reference in their entirety.

In accordance with some embodiments, the Vector Database 102 is constructed by the Vector Database Constructor & Updater 103. In some embodiments, the Vector Database 102 contains embeddings of textual data; and/or it can be a single multi-tenant database with multiple collections of data (rather than being implemented as a plurality of separate databases); or as a plurality of multi-tenant vector databases. In some embodiments, a single multi-tenant vector database may be preferred, to enable utilization of a single query in order to obtain K Nearest Neighbors (K-NN) as a hybrid search, thus obtaining both text and semantics from all vectors together (e.g., implemented using a Microsoft Azure cognitive search vector database). The Vector Database 102 is updated by the Vector Database Constructor & Updater 103, dynamically and/or continuously and/or in real-time or in near-real-time and/or periodically (e.g., at pre-defined time intervals; such as, every hour, or every day, or every week) and/or upon one or more triggering events or triggering conditions that can be configured or set by an administrator (e.g., if at least N new users have joined the organization, or it at least N new email accounts or user accounts have been created in the organization).

The Vector Database 102 may contain multi-tenant data, including (for example) (i) Analysis Reports, (ii) Threat Models Metadata, and (iii) Security Domain-Related Documents.

With regard to the Analysis Reports, this Vector Database contains a collection of Incident Reports that were already prepared by analysts (which may be human analysts, or machine-based/automated analysts, or hybrid reports prepared by combined efforts of a human and a machine). Each such Analyst Report may include, for example: (a) data indicating or identifying or describing the particular/current Alert that is being investigated or analyzed in this report "Alert Under Investigation"); (b) previous alerts and/or previous incident reports that were generated or received in the past and that are determined or estimated to be related to this particular Alert Under Investigation; (c) textual/verbal explanation and description of the investigation process and the steps that were taken as part of investigating this alert; (d) date-stamp and time-stamp of the Alert Under Investigation, indicating the date and the time-point at which the Alert Under Investigation was generated and/or received; (c) identifiers or descriptors of metadata of the Alert Under Investigation, such as, which entity/component has generated the Alert Under Investigation, which entity/component/ sender had sent the Alert Under Investigation, which recipient(s) has received the Alert Under Investigation, which particular data assets/repositories/documents/folders/files/ digital objects/user-accounts/users are mentioned in the Alert Under Investigation or are potentially affected by the Alert Under Investigation or are potentially attacked or compromised; (f) identifiers or descriptors of corrective actions/mitigation actions/remedial actions that are mentioned within the Alert Under Investigation itself (e.g., if such actions were suggested by the entity/component that generated the Alert Under Investigation and/or that sent the Alert Under Investigation); (g) list of one or more possible next steps that an attacker may do or should do in order to continue the attack that is described in (or that can be deduced from) the Alert Under Investigation; (h) indicators of the type and/or size of damage that may result from the attack that is described in (or that can be deduced from) the Alert Under Investigation, such as, deletion of files or data, hostile modification of files or data, exfiltration of data or user credentials, obtaining Root Access to a device, undesired encryption of data (Ransomware attack), utilizing a device for D-DOS attacks, or the like; (i) recommendations/ suggestions/proposals from the analyst on how to respond to the Alert Under Investigation, and/or which remedial/corrective/mitigation actions to perform or to initiate, and/or which parameters to monitor, in order to prevent or stop the attack or possible damage, or in order to stop or prevent the next step(s) of the attack.

With regard to Threat Model Metadata, the Vector Database may embed therein a plurality of documents describing Threat Model Metadata. With regard to Security Domain-Related Documents, these may include security-related/ cyber-security-related documents that are obtained from public repositories and/or private repositories and/or proprietary sources; including, but not limited to, data or documents obtained or extracted from the MITRE ATT&CK framework, data or documents from the National Vulnerability Database (NVD) of the National Institute of Standards and Technology (NIST), one or more advisories or CVE items or CVE data (e.g., obtained from the Common Vulnerabilities and Exposures program of NIST), and/or other data.

It is noted that in accordance with some embodiments, the Vector Database may contain copies of actual security-related/vulnerability-related documents (e.g., full documents, or extracted portions thereof), and not merely parametric data; as the text and content of such (full or partial) documents can then be used, in accordance with some embodiments, by one or more LLMs (directly or indirectly) in order to analyze or further analyze the Alert Under Investigation and/or in order to automatically construct an Incident Report.

In accordance with some embodiments, the system includes and/or utilizes one or more LLM. In a demonstrative implementation, a first LLM 115A may be utilized for data collection and extraction and/or for organizing such collected/extracted data and/or for summarizing such collected/extracted data; a second LLM 115B may be utilized for analyzing the organized collected/extracted data; a third LLM 115C may be utilized for generating queries that would then be applied by an Applicative Layer Agent Unit 122 towards the Vector Database 102; a fourth LLM 115D may be used for generating the final Incident Report, optionally by using insights or outputs generated in concert or in parallel by a plurality of LLMs of an LLM Chain.

In some embodiments, optionally, two or more of such LLMs may be implemented using a single Large Language Model, or using two separate Large Language Models. For example, in some embodiments, LLM 115A may be implemented as a Llama 2 LLM, whereas LLM 11B may be implemented as a Mistral LLM; whereas in other implementations, a single Large Language Model may be used for two or more of such LLMs. In some embodiments, if two or more separate/different Large Language Models are used, optionally, each of them may be fine-tuned separately on a different large labeled dataset.

Each of such LLMs may be configured or fine-tuned, continuously and/or periodically (e.g., every week, every month) and/or in response to a triggering event and/or if one or more conditions hold true, and/or in response to a fine-tuning command that was received from a system administrator or from another component of the system. In some embodiments, optionally, a fine-tuning iteration may be performed prior to substantially every generation of an Incident Report, or every Nth generation of Incident Report (e.g., every 2 or 5 or 10 incident reports), and/or at particular time intervals.

Each of such LLMs may be a fine-tuned open-source LLM (Llama 2, Mistral, or the like) or a closed-source LLM or a proprietary LLM. The fine-tuning is performed based on the data and documents that were collected as described above. In some embodiments, the fine-tuning is performed on a labeled large dataset. It is noted that while the Vector Database is regularly/continuously/periodically updated, a re-training of the LLMs is not needed; as the same LLM is able to access data that was collected or added after its initial fine-tuning process.

The LLM Fine-Tuner 120 operates by setting/modifying/adjusting the weights of one or more of the LLMs; those weights are LLM parameters that had been defined based on pre-training that LLM on a large corpus of general data, and the fine-tuning process adjusts those weights in order to achieve improved performance of that LLM in specific task(s)/domain(s), such as in the domain of cyber-security and/or in the task of generating Incident Reports for incoming security alerts. In some embodiments, the fine-tuning process continues the training process of the LLM with a smaller, targeted, dataset that is representative of the task-of-interest (e.g., generating Incident Reports for incoming security alerts) and/or domain-of-interest (e.g., cyber-security).

The Applicant has realized that it may be beneficial or advantageous to perform fine-tuning of the LLM(s), rather than utilizing an off-the-shelf/general LLM, to improve performance and reliability and/or due to several reasons. Firstly, Specialization: pre-trained language models have a general and broad understanding of language, they are typically not optimized for specific jargon or keywords or "buzzwords" or "slang terms" or writing styles or nuanced expressions or terms-of-art that are used in particular domains; such that a general LLM may not readily "know" or "understand" (or, correctly process) specific terms in the field of cyber-security; a general LLM may know what is an Attack or even a Phishing Attack, but may not be familiar with "a Vishing attack" (which is a phishing attack perform via voice) or a "Jugging attack" (following a user who withdrew money from an ATM) or other jargon in this specific field/s (cyber security, data protection, computer-related vulnerabilities). Furthermore, a general-purpose LLM may incorrectly interpret these terms as "typographical errors", or may treat a correct term like "MITRE ATT&ACK" as if it contained a spelling mistake, and so forth. Secondly, Improved Performance: the fine-tuning process enables the language model to adapt its parameters to the specifics of a dataset, which can lead to better performance metrics (such as accuracy, F1 score, precision score, recall score, precision-and-recall score) on the desired task. Thirdly, Task-Specific Knowledge: tasks like question-answering, summarization, or sentiment analysis may require the language model to learn patterns that were not the focus of its initial pre-training. In accordance with some embodiments, the fine-tuned model learns to analyze the incident data and create a knowledge graph that would be provided as input to the Applicative Layer Agent Unit 122 that would then further split or divide the knowledge graph into sub-tasks. Fourthly, Data Efficiency: fine-tuning the language model may contribute to achieving better results with relatively small amounts of task-specific data, thereby leveraging the knowledge that was already encoded in the language model during its pre-training. Finally, Addressing Data Bias: a general pre-trained language models might inherit biases from its general corpus of training data; whereas fine-tuning the language model on a more balanced/focused/relevant/domain-specific/task-specific/curated dataset can help reduce or mitigate such biases.

In accordance with some embodiments, the fine-tuning of the LLM(s) may include several operations or steps. They are presented herein in a discussion order from (A) to (F), yet some of these operations may be performed concurrently or in other order or sequence.

Step (A) includes Initialization: The LLM starts with weights that have been learned during its pre-training phase. This may be general weight values that had been established when the LLM was trained on a general corpus of knowledge, that is not specific to the task of generating incident reports and is not specific to the domain of cyber-security.

Step (B) includes Task-Specific (and/or domain-specific) Training: The LLM is fine-tuned using a task-specific dataset and/or a domain-specific dataset and/or a dataset that is both task-specific and domain-specific. This dataset is significantly smaller than the dataset used for general pre-training of the LLM; and it contains examples of the task that the LLM would later needs to perform, and/or numerous examples of documents and data-portions and text-portions that the LLM would later process and/or generate (e.g., examples of incoming alert messages; examples of incident reports; examples of vulnerability reports or CVE items; descriptive examples of attack chains; descriptive examples of types and scope of damage that a particular attack can cause; descriptive examples of mitigation/prevention operations that are associated with particular attacks or vulnerabilities; or the like).

Step (C) includes Parameter Adjustment or parameter modification: as part of the fine-tuning process, the LLM's parameters (weights and biases) are updated/modified/adjusted, to minimize the loss function specific to the task, and/or to increase the relevance and accuracy of outputs that the LLM would later generate with regard to such task. This may be performed using gradient descent (or stochastic gradient descent, and/or other optimization algorithm(s) for finding a local minimum of a differentiable function, or for finding coefficients that minimize a cost function), back-propagation (backward propagation of errors, or back-propagating error correction, or other algorithm working back from output nodes to input nodes), or other suitable methods.

Step (D) includes setting or configuring or modifying (and particularly, decreasing) the Learning Rate. For example, a reduced learning rate can be used (e.g., compared to the learning rate in the initial pre-training phase), to make smaller adjustments to the weights, and/or to avoid over-writing the pre-existing knowledge that is already encoded in the language model. This ensures that the language model does not "forget" the initial information on which it was trained, but rather, learns the new/additional capabilities.

Step (E) includes Regularization: some embodiments may utilize techniques such as early stopping or dropout, to prevent overfitting of the language model to the particular/task-specific/domain-specific dataset that is utilizes for the fine-tuning, ensuring that the language model still retains its generalization capabilities.

The fine-tuning may include handling of Freezing Layers or Frozen Layers: the Applicant has realized that sometimes, only some of the language model's layers are fine-tuned, while other layers are "frozen"; such as, the last few layers are fine-tuned because they are more task-specific, whereas earlier layers (that are further away from the intended specific task) capture general language features. The fine-tuning process may ensure that not only some of the layers, but rather, most or all of the layers, of the language model are updated/fine-tuned for the specific task and/or specific domain.

The fine-tuning may include a balancing between (I) retaining the vast general knowledge that the language model had already gained during its general pre-training, and (II) sufficiently adapting/adjusting/configuring/modify-ing the language model to excel at a specific task and/or to excel in generating output and insights in a specific domain. Some embodiments may fine-tune the language model to "understand" input texts and data, and to generate output text in a way that is tailored to the requirements of a particular application; which is, for example in this imple-mentation, analysis of the alert/incident based of a large range of data types and outputting a knowledge graph that would be utilized by the Applicative Layer Agent Unit 122 or the Incident Report Generator 106 downstream.

Some embodiments may construct, and then dynamically or periodically update and configure, Applicative Layer Agent Unit 122 which may be implemented as Incident Report Generator 106. For example, a first LLM in combi-nation with prompt engineering techniques are utilizes to construct and to update such Incident Report Generator 106, which by itself may be implemented as a second LLM. In a demonstrative implementation, one LLM is utilized as a Query-Generating LLM, and it generates queries and prompts that the Applicative Layer Agent Unit 122 then applies to the vector database(s).

The input that the Applicative Layer Agent Unit 122 receives is an incoming/a generated Security Alert Message, that is intended to be automatically investigated. The input may be received manually, via an administrator who manu-ally pushes an alert message into the Applicative Layer Agent Unit 122 for analysis; or, the input may be received automatically, such that the same pipeline or recipient or node that receives (or that relays, or that generates) the Alert Message, also forwards or copies or sends that Alert Mes-sage to the Applicative Layer Agent Unit 122 and triggers the Applicative Layer Agent Unit 122 to start the process that generates an Incident Report.

For example, upon receiving the Alert Message, the Applicative Layer Agent Unit 122 is triggered to cause LLM-based analysis of the Alert Message and to generate and output the Incident Report, which in turn is delivered to one or more pre-defined recipients (e.g., system administra-tor; fraud mitigation department) and/or to one or more components or sub-systems (e.g., an automated unit or module or component that is triggered by the Incident Report to perform one or more fraud mitigation/attack mitigation operations).

For example, LLM 115C generates queries that the Appli-cative Layer Agent Unit 122 then executes on the one or more Vector Database(s) described above. The queries that are generated by the LLM 115C, and that are then utilized by the Applicative Layer Agent Unit 122 to query the database(s), can be, for example: (a) Which attack opera-tions typically precede the attack (or problem, or vulner-ability, or security issue) described in this Alert Under Investigation? (b) Which attack operations typically follow the attack (or problem, or vulnerability, or security issue) described in this Alert Under Investigation? (c) What is the Attack Chain that typically includes the attack (or problem, or vulnerability, or security issue) described in this Alert Under Investigation? (d) Were there any previous alert messages, that preceded this Alert Under Investigation, about attack operations that are related to the attack (or problem, or vulnerability, or security issue) described in the Alert Under Investigation? (c) Are there any subsequent alert messages, that were generated after the generation of this Alert Under Investigation, about attack operations that are related to the attack (or problem, or vulnerability, or security issue) described in the Alert Under Investigation? (f) What is the expected type and scope of damage or adverse results, that may result from the attack (or problem, or vulnerability, or security issue) described in the Alert Under Investigation? (g) What are the mitigation/prevention operations that can or that should be performed, to mitigate or prevent or stop the attack (or problem, or vulnerability, or security issue) described in the Alert Under Investigation, or to minimize or reduce its damage? Other prompts or queries may be generated by the LLM 115C, and may then be applied to the database(s) by the Applicative Layer Agent Unit 122.

In some embodiments, LLM 115C generates queries that the Applicative Layer Agent Unit 122 will execute on (or send to) the vector databases described above, the results will be returned in a textual format and fed back to one or more of the LLM(s); which may then dynamically generate additional/new/supplemental queries, taking into account the fresh responses that the Applicative Layer Agent Unit 122 has recently provided in response to previous queries in this alert investigation session. In some embodiments, an iterative process may be performed, optionally until a par-ticular condition holds true; for example, for up to N iterations (e.g., up to 8 or up to 128 iterations), or for up to M queries in total (e.g., limiting one or more of the LLMs to ask up to 512 queries for each Alert Under Investigation, or per each iteration), or for up to T seconds of processing (e.g., enabling the Applicative Layer Agent Unit 122 to iterate up to 90 seconds in total), or the like.

In accordance with some embodiments, the prompt or query that is utilizes by the Applicative Layer Agent Unit 122 may contain descriptors of the vector database(s) schema and columns, thus providing to the one or more LLM(s) also code-generation capabilities to generate a suitable query without the need for re-training or further fine-tuning for this purpose. The Applicative Layer Agent Unit 122 has access to the content, the data and the metadata of the vector database(s), and can pass such information to the LLM(s) in the prompt as context.

In some embodiments, the prompt that is utilized may contain instructions to perform the following demonstrative steps: (a) Your goal is to construct a knowledge graph, that should contain the Alert Under Investigation, the entities that are related to the Alert Under Investigation (e.g., sender, recipient, related devices, affected devices, related user-accounts, related IP addresses, related or potentially affected assets/repositories/files/servers/machines, or the like), and should further show the relation among those entities; (b) Perform a loop (e.g., of at least N iterations, and/or not more than M iterations) until you estimate that you collected sufficient information to generated a detailed Incident Report; (c) Given all the information that was already collected, generate a Question that is needed to be answered in order to advance the analysis of the Alert Under Investigation; or generate a Question that is expected to provide an answer that is estimated to assist in generating one or more insights regarding the Alert Under Investigation; (d) Retrieve additional data from the available vector database(s); (e) retrieve additional information from the actual repository/network/system for which the Alert Under Investigation was generated (e.g., retrieve actual data and/or metadata and/or documents from the customer's environment); (f) update the Knowledge Graph accordingly, by adding/creating new nodes and/or links, and by discarding/removing nodes and/or links that now have low probability (based on the new information gathered in the latest iteration); and iterate said loop. The Knowledge Graphs can be especially useful for such "multi-hop" question answering and real-time analysis of structured and unstructured data; optionally, tools similar to LangChain can be utilized for this purpose.

It is noted that the Applicative Layer Agent Unit 122 is also configured and able to pose questions that pertain to the specific context of the Alert Under Investigation in the customer's system (the particular network/system to which the Alert pertains); for example, the Alert Under Investigation may query, (a) what are the read/write/access privileges of User X, or (b) who are the immediate/regular peers of User Y, or (c) did User Z send any email to User W in the past 12 months, or (d) did User Z receive any email from User W in the past 6 months, or (e) is there a manager/subordinate relation between User A and User B, or (f) does User A have authorized access to legal/financial data of this organization, or (g) did User A attend any meeting with User B in the past 6 months as reflected in their Calendars; or other queries that research the organizational context and/or that can generate insights reflecting the organizational context.

In some embodiments, the Applicative Layer Agent Unit 122 is a unit that is constructed one time, and is not necessarily specific to a particular customer (e.g., to a particular organizational network/organizational system). In other embodiments, the Applicative Layer Agent Unit 122 may be pre-configured to better accommodate a particular domain of operations, or a particular type of customer, or even a particular customer; for example, security risks that are relevant to organizations in the healthcare industry (that are subject to HIPAA laws and regulations), differ from security risks that are relevant to organizations in the legal field, or in the banking industry; and such differences may be reflected in the particular configuration of the Applicative Layer Agent Unit 122 and/or in the particular fine-tuning of one or more of the LLM(s) being used. For example, an Applicative Layer Agent Unit 122 and/or an LLM that are intended to be used at a hospital, may be specifically configured or fine-tuned to ask queries and/or to collect data and/or to generate insights that are specifically relevant to the healthcare industry.

Some embodiments thus provide systems and methods that are capable of constructing and operating an LLM-Based (or LLM-powered) Incident Report Generator, implemented using the Applicative Layer Agent Unit 122; which receives as input an incoming Alert Message or Alert signal, including alert content and alert metadata (e.g., time and date of alert generation/sending; identity of alert sender; identity of alert recipients; IP addresses; related digital assets; geo-location information); and which automatically generates an Incident Report that reflects attack chain analysis on past attack steps or past alerts, as well as predicted next steps of the attack, and proposal of mitigation/prevention/corrective/remedial actions that can or that should be performed automatically and/or manually.

In some embodiments, the language-understanding capabilities of the LLM(s) that are involved in the automated and LLM-powered Incident Report generation, are used in several different ways: (a) Semantic similarity to past reports; for example, different Threat Models may be closely related when analyzing a threat model's metadata, such as, Threat Model A is titled "Potential Brute Force attack targeting multiple accounts", whereas Threat Model B is titled "Successful Brute Force attack targeting a specific account"; thus enabling the LLM-powered Incident Report generator to detect this broader context and to "understand" that an attack chain had started with "potential" attack steps and has now matured into a "successful" attack step in the same attack chain; (b) Decision making, with regard to what data to collect next based on the already-collected data and already-generated insights, from the vector database(s) and datasets that are available for the Incident Report Generator; for example, the LLM-Based Incident Report Generator 106 can query about past accesses of User A or Device B to a particular Repository C, or may query about past events/emails/activities/log-in operations/log-out operations/geo-locations of a particular user or entity to which the Alert pertains, or the like; (c) Security Domain Understanding, such as, recognizing and understanding that a "ticket harvesting attack" is typically follows by a "Brute Force attack" or by a "Password Spraying attack", and the fine-tuned LLM has sufficient security "understanding" to know or to detect such connections and relations, thereby enabling the LLM to generate insights that predict the next steps of the attack and that further propose the relevant mitigation/prevention/remedial actions.

In some embodiments, the system may perform fine-tuning of the LLM for the specific task of analyzing a large volume of "raw" data and generating as output a knowledge graph that then the Incident Report Generator can use (e.g., passing it to its own LLM as a secondary LLM in an LLM chain). In some embodiments, the Knowledge Graph generated by the LLM can even be divided or split into parts or portions or sub-trees, and each sub-tree is then allocated to a particular LLM, for better understanding of the flow of the attack and the relevant attack chain or attack vector. For example, one LLM may be allocated the sub-task of investigating prior and subsequent alerts that may be related to the current Alert Under Investigation; another LLM may be allocated the sub-task of detecting/determining who are the regular Peers of the user(s) to which the Alert Under Investigation pertains, and what were the recent or past communications among those Peers; another LLM may be allocated the sub-task of investigating the organizational context with regard to user privileges and access privileged, such as, is User A generally authorized to access Organizational Resource B, or does User B have access to financial/legal data or sub-systems of the organization; and finally, a Master LLM or a Coordinating LLM may be tasked with collecting and combining the outputs generated from each of those LLMs that investigated each aspect or that performed each sub-task, and generating additional insights from the cumulative information generated by those separate LLMs.

In some embodiments, the one or more LLM(s) may be fine-tuned, and may be utilized to generate a set of tasks that are transferred downstream in the LLM chain, to a single LLM or to a plurality of LLMs (optionally controlled/managed by a Supervisory LLM that combines their insights and/or generates additional insights or meta-insights from their separate outputs or their separate insights). The set of tasks that one LLM has generated is used as the input to other LLM(s) down the LLM chain and/or to the Applicative Layer Agent Unit 122 (optionally utilizing LangChain or similar tools) or the orchestrating unit or the supervisory unit that controls the plurality of LLMs that collect/summarize/analyze all the needed information, which is then passed to the last LLM that generates the final Incident Report and that makes the final decision with regard to risk level and mitigation actions. The applicative agent is able to retrieve data from external vector databases (including organizational information) and other APIs (e.g., Threat Intelligence (TI) knowledgebase, other/external knowledgebase for enrichment and for context augmentation).

In accordance with some embodiments, the Applicative Layer Agent Unit 122 is the component that has the direct access to the vector database(s) and that provides the responses to the relevant LLM(s) based on their queries. In some embodiments, the Applicative Layer Agent Unit 122 is not an LLM; rather, it is an inference/searcher module, that uses a model for inference, takes the query text, searches the K nearest neighboring (K-NN) items in the vector database (s) with the highest similarity score, and then passes those items (or their content, or content-portions extracted from them) as the context to the language model as part of Retrieval Augmented Generation (RAG). In accordance with some embodiments, only a program code (the Applicative Layer Unit 122) has access to the vector database(s); and that program code (the Applicative Layer Agent Unit 122) operates as a "delivery service" that locates and retrieves the most-relevant or "nearest" data objects from the vector database(s), according to the queries outputted by the LLM(s) and passes those "nearest" data object as the output of the Applicative Layer Agent Unit 122 to provide them as a context to the next LLM(s).

Figure 2:
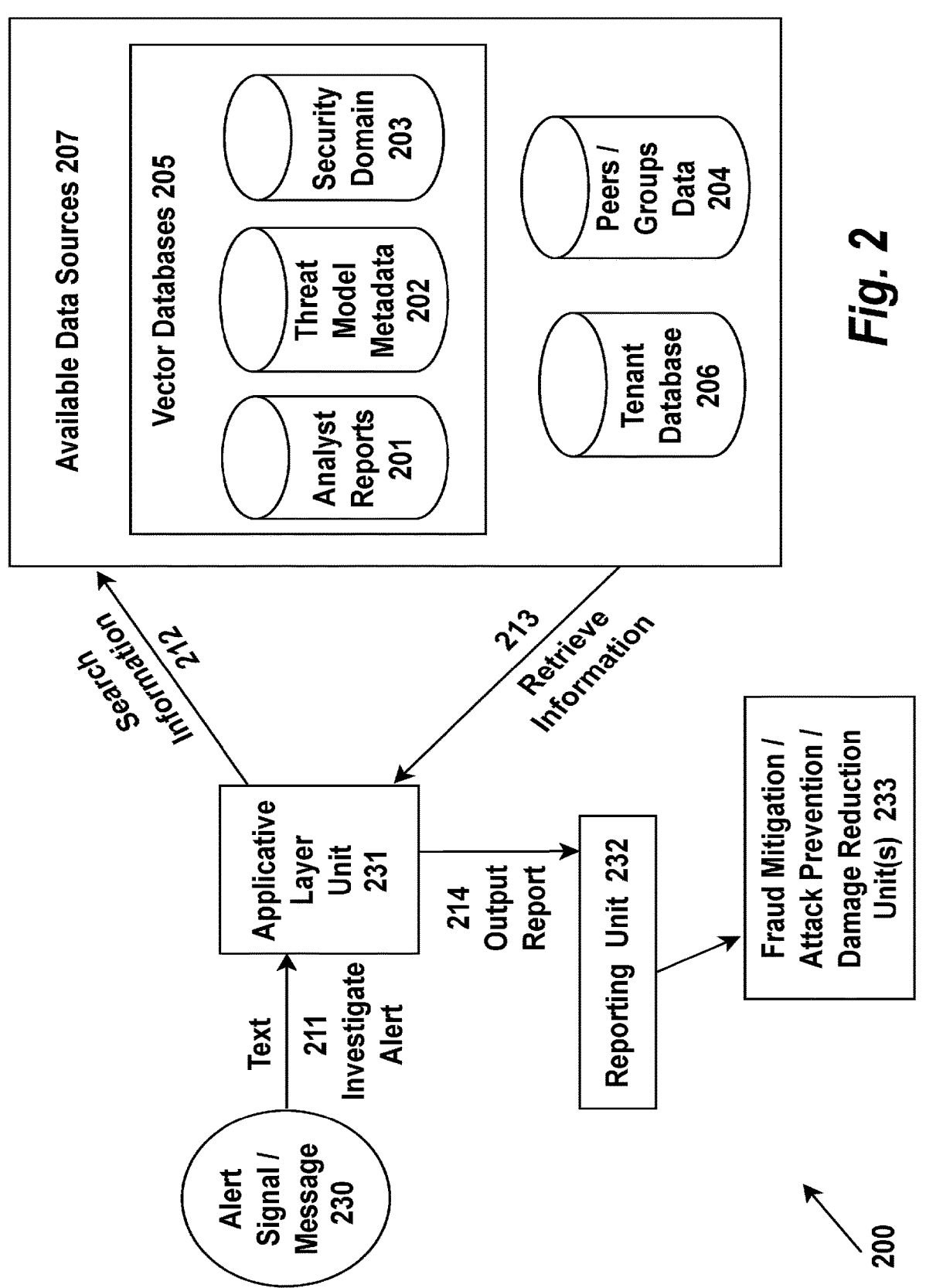
FIG. 2 is a schematic block-diagram illustration of a system, in accordance with some demonstrative embodiments.

Reference is made to FIG. 2, which is a schematic block-diagram illustration of a system 200, in accordance with some demonstrative embodiments. A plurality of Available Data Sources 207 may include, for example: one or more Vector Databases 205, such as an Analyst Reports database 201, a Threat-Model Metadata database 202, a Security Domain database 2023; as well as a Tenant Database 206 (e.g., pertaining to the particular organization being protected against attacks), Peers/Groups Data 204, and/or other data sources.

An Alert Signal/Alert Message 230 is received (or is generated by a component in the system/network of the organization), and its content and text and metadata are transferred (arrow 211) to an Applicative Layer Unit 231 that automatically investigates the alert; by searching information (arrow 212) in the Available Data Sources 207, and by retrieving the most relevant information (arrow 213) from the Available Data Sources 207. The retrieved data is utilized to generate the Incident Report (arrow 214), such as by utilizing one or more LLMs which are operably associated with the Applicative Layer Unit 231 and receive its outputs. The Incident Report is transferred to a Reporting Unit 232; which may trigger operations by one or more Fraud Mitigation/Attack Prevention/Damage Reduction Units 233.

Figure 3:
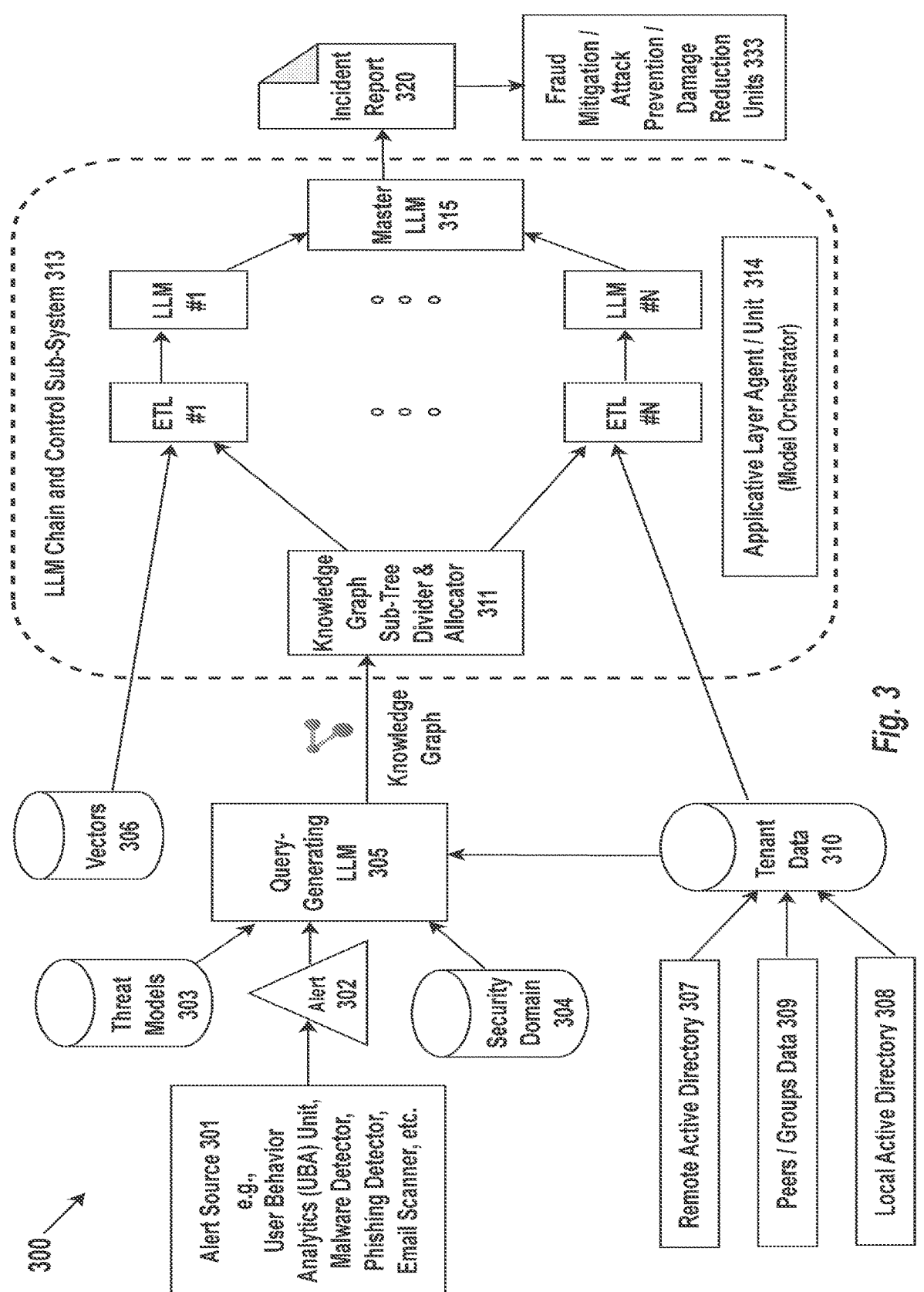
FIG. 3 is a schematic block-diagram illustration of a system, in accordance with some demonstrative embodiments.

Reference is made to FIG. 3, which is a schematic block-diagram illustration of a system 300, in accordance with some demonstrative embodiments. System 300 of FIG. 3 may be, for example, a particular implementation of System 200 of FIG. 2. An Alert 302 (e.g., Alert Message or Alert Signal) is received from an Alert Source 301, such as a User Behavior Analytics (UBA) Unit, a malware detector, a phishing detector, an email scanner, or the like. A Query-Generating LLM 305 receives a copy of the Alert (including its content and metadata). The Query-Generating LLM 305 was fine-tuned using data from a Threat-Model Metadata database 303 and/or data from a Security Domain knowledgebase 304, and optionally also from a Tenant Data 304 that contains organization-specific data or that provides organization-specific context (e.g., compiled or extracted from a Remote (e.g., Azure) Active Directory 307, from a Local Active Directory 308, from a Peers/Groups Data Source 309, or the like).

The Query-Generating LLM 305 generates a Knowledge Graph that is provided to an LLM Chain and Control Sub-System 313. For example, a Knowledge Graph Sub-Tree Divider & Allocator 311 operates to break or split or divide the Knowledge Graph into portions or sub-tasks; and an Application Layer Unit 314 (or similar Model Orchestrator unit) controls the assignment of each such sub-task or graph-portion to a different LLM, out of a plurality (denoted N) of such LLMs that operate in parallel and/or in series. Each of the LLMs (from 1 to N) may be preceded by, or associated with, an ETL unit (denoted respectively from 1 to N), which performs "Extract, Transform and Load" operations on the input data and provides it to the relevant LLM. Optionally, each of the LLMs, or at least one of them or some of them, may further receive inputs from (or, may have access to contextual data from) the Tenant Database 310 and/or from other Vector Database 306. The plurality of LLMs (from 1 to N) generate a plurality of LLM-based Outputs, that are collected and combined by a Master LLM 315, which generates an Incident Report 320 and determines the results that should be highlighted in such report (e.g., risk level; mitigation actions). Optionally, the Incident Report 320 or operative portions thereof may be transferred to other components, such as Fraud Mitigation/Attack Prevention/Damage Reduction Units 333, to automatically trigger or activate the suitable/the relevant/the proposed remedial operations that were indicated in the Incident Report 320.

Figure 4:
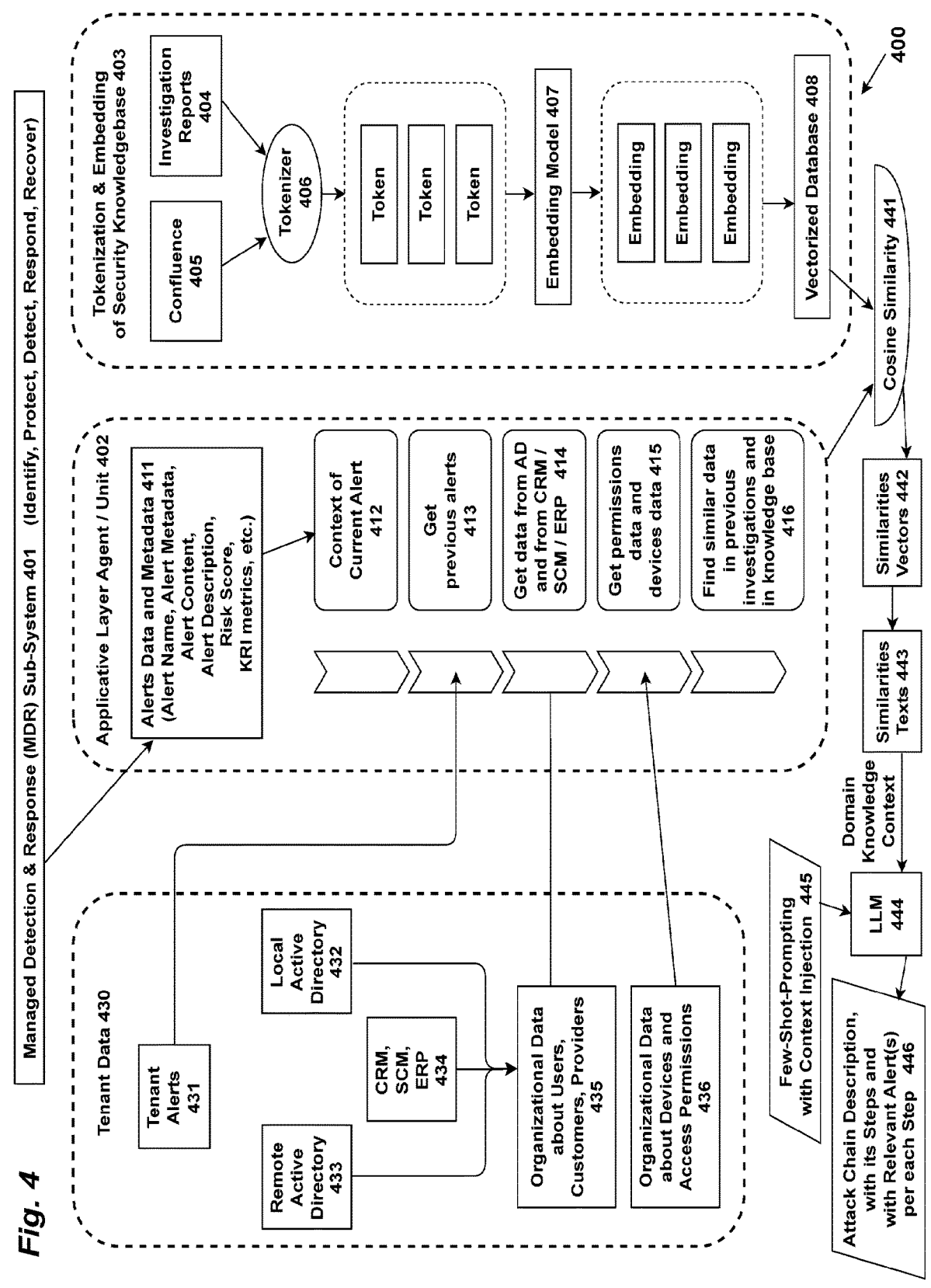
FIG. 4 is a schematic block-diagram illustration of a system, in accordance with some demonstrative embodiments.

Reference is made to FIG. 4, which is a schematic block-diagram illustration of a system 400, in accordance with some demonstrative embodiments. For example, a Managed Detection & Response (MDR) Sub-System 401 operates to protect an organization (e.g., its data repositories, its servers, its end-user devices) against threats and attacks; such as, by performing operations to identify threats and attacks, to protect against them or to prevent them, to detect an attempted or executed attack, to respond to attacks, and to recover damaged data or systems. Such MDR Sub-System 401, or other local component or remote component, generates an Alert message or Alert signal.

An Applicative Layer Agent/Unit 402 operates to receive such alerts, shown as Alerts Data and Metadata 411 (e.g., alert name, alert content, alert description, alert metadata, risk score, Key Risk Indicator (KRI) metrics), and to automatically investigate such alerts. It generates the Context for the Alert Under Investigation (block 412); it obtains previous alerts (block 413) to search for related alerts (and in some embodiments, it also obtains subsequent alerts, such as, another alert that was received on another device in the organization just few seconds after the reception of the Alert Under Investigation). The Applicative Layer Agent/Unit 402 further obtains data from remote and local Active Directory (AD) components, and from CRM/CSM/ERP systems (block 414).

The Applicative Layer Agent/Unit 402 obtains data or descriptors of the devices and users of the organization, as well as descriptors or definitions of the access privileges and permissions of each user and/or each end-user device and/or each machine of the organization (block 415), such as, a descriptor that User A is authorized to access Resource B; a descriptor that User C is not authorized to access Resource D; a descriptor that Device E is authorized to access Resource F; a descriptor that Device G is not authorized to access Device H; descriptors with higher granularity, pertaining to privileges of users or devices to create/delete/modify/read/write data, or the like. The Applicative Layer Agent/Unit 402 searches for, and finds, similar data in previous investigations in this organization and/or in a relevant knowledge-base (block 416).

The relevant data is obtained from one or more repositories or sources of Tenant Data 430; for example, previous and subsequent Alerts 431, a Local Active Directory 432, a Remote Active Directory 433, subsystems of CRM/SCM/ERP 434; organizational data about users and customers and providers 435; and organizational data about devices and access permissions/privileges/constraints 436.

The system further performs Tokenization and Embedding of Security Knowledgebase (block 403). For example, investigation reports 404 and collaboration/confluence data 405 are fed into a Tokenizer 406 that performs tokenization into tokens; and an Embedding Model 407 generates embeddings, creating a Vectorized Database 408. A similarity function 441, such as a Cosine Similarity function or other algorithm to measure similarity among vectors, receives as input: (i) security domain related vectors from the Vectorized Database 408, and (ii) organizational context vectors from the Applicative Layer Agent/Unit 402, and generates Similarities Vectors 442, which are converted into Similarities Texts 443 (or similarities text-portions); that are fed into an LLM 444 as domain knowledge context and organizational context. Few-Shot-Prompting with Context Injection is performed (block 445), and the LLM 444 generates an Attack Chain Description 446, including its discrete steps, and further describing each step in the attack chain and which Alerts were already received in the organization for that step (e.g., Attack Chain step 1, received so far 17 related alerts; Attack Chain step 2, received so far 8 related alerts; Attack Chain step 3, receives so far 5 related alerts).

Some embodiments provide a non-transitory storage medium having stored thereon instructions that, when executed by a machine, cause the machine to perform a method as described above and/or herein.

Some embodiments provide a system comprising: one or more hardware processors, configured to execute code; associated with one or more memory units, configured to store data; wherein the one or more hardware processors are configured to perform an automated process or an automated method as described above and/or herein.

Some embodiments provide a computerized method for automatically generating Incident Reports for an organization that receives incoming alert messages. The method comprises, for example: (a) receiving an incoming Security Alert Message pertaining to a possible security-related incident; (b) feeding into a Large Language Model (LLM), at least: (b1) content of said Security Alert Message, and (b2) metadata of said Security Alert Message, and (b3) context information describing a security domain, and (b4) organization context information pertaining to users and machines of said organization; (c) prompting said LLM to automatically investigate said Security Alert Message and to automatically generate a detailed Incident Report pertaining to said Security Alert Message; wherein the method is implemented (or implementable) by utilizing at least one hardware processor.

In some embodiments, item (b3) of step (b) comprises: utilizing another LLM to generate the context information describing said security domain, by LLM-powered analysis of (I) previous Incident Reports, and (II) a knowledgebase that describes vulnerabilities and threats and attacks.

In some embodiments, item (b4) of step (b) comprises: generating organizational context from one or more Active Directory (AD) components of said organization, wherein said organizational context describes at least: (i) users in said organization, and access privileges of each user to each resource of the organization; (ii) devices in said organization, and access privileges of each device to each resource of the organization.

In some embodiments, item (b4) of step (b) comprises: generating further organizational context from one or more of: a Customer Relationship Management (CRM) system of said organization, a Supply Chain Management (SCM) system of said organization, an Enterprise Resource Planning (ERP) system of said organization.

In some embodiments, said further organizational context describes at least one of: typical actors of particular customers of the organization; typical digital behavior of particular customers of the organization; typical actors of particular suppliers of the organization; typical digital behavior of particular suppliers of the organization. In some embodiments, "typical" may be determined based on predefined rules or threshold values, or based on determining a maximum value or a most-frequent value.

In some embodiments, item (b4) of step (b) further comprises: generating additional organizational context that describes Peer Groups among users of said organizations, based on a peer group detection process that checks which users regularly interact with which other users in said organization.

In some embodiments, the method further comprises: automatically investigating said Security Alert Message via said LLM, by taking into account at least one of: (i) one or more Alert Messages that were received prior to said Security Alert Message, (ii) one or more Alert Messages that were received subsequent to said Security Alert Message;

and determining via LLM-powered deduction that said Security Alert Message is part of a particular Attack Chain.

In some embodiments, said LLM comprises an LLM-chain of two or more LLMs; wherein a first LLM of said LLM-chain generates a Knowledge Graph pertaining to said Security Alert Message and to information that the first LLM determines to be relevant to said Security Alert Message.

In some embodiments, the method further comprises: dividing said Knowledge Graph into sub-tree tasks, and allocating each sub-tree task to a different LLM of said LLM-chain.

In some embodiments, the method further comprises: collecting a plurality of outputs generated by said plurality of different LLM of said LLM-chain; and feeding said plurality of outputs into a Master LLM that is configured to generate an Incident Report about pertaining to said Security Alert Message.

In some embodiments, the method further comprises: inserting into said Incident Report, by at least one LLM of said LLM-chain, a content portion that describes mitigation operations that should be performed to stop or prevent damage from a cyber-attack.

In some embodiments, the method further comprises: inserting into said Incident Report, by at least one LLM of said LLM-chain, a machine-readable code portion that triggers one or more Mitigation Units to automatically perform one or more Mitigation Operations that stop or prevent damage from said cyber-attack.

In some embodiments, the method further comprises: (A) collecting documents describing cyber-attacks and attack chains, and documents describing threats and vulnerabilities; and (B) performing tokenization into tokens, of the documents collected in step (A); and (C) creating embeddings from said tokens, based on a particular embedding model; and (D) constructing a Vectorized Dataset from said embeddings.

In some embodiments, the method further comprises: fine-tuning said LLM, by modifying weights of parameters that said LLM uses, based on said Vectorized Dataset.

In some embodiments, said fine-tuning specifically modifies said LLM to generate relevant and accurate outputs in response to engineered prompts that command said LLM to perform a specific task of Incident Report generation in a specific field of Security Domain.

In some embodiments, prior to being prompted to generate said Incident Report, said LLM is fine-tuned based on a Labeled Dataset that was constructed based on embeddings from tokens of tokenized documents in a field of Security Domain.

In some embodiments, the method further comprises: feeding into said LLM (a1) security domain knowledge context, and (a1) organizational context reflecting relations among users and peer groups of users, and (s3) organizational context reflecting permissions of users to access organizational resources; prompting said LLM to utilize items (a1) and (a2) and (a3) in generating said Incident Report.

In some embodiments, the method further comprises: utilizing a Query-Generating LLM, to generate specific queries and specific prompts that are estimated to enable generation of said Incident Report based on said Security Alert Message.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

Some embodiments may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Some embodiments may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of some embodiments may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of some embodiments may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit, a Flash drive), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Dart, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results (e.g., within a pre-defined threshold level of similarity; such as, within 5 percent above or below a pre-defined threshold value), among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A computerized method for automatically generating Incident Reports for an organization that receives incoming alert messages, the computerized method comprising:

(a) receiving an incoming Security Alert Message pertaining to a possible security-related incident;

(b) feeding into a Large Language Model (LLM), at least:
  (b1) content of said Security Alert Message,
  (b2) metadata of said Security Alert Message,
  (b3) context information describing a security domain,
  (b4) organization context information pertaining to users and machines of said organization;

(c) prompting said LLM to automatically investigate said Security Alert Message and to automatically generate a detailed Incident Report pertaining to said Security Alert Message;

wherein the method is implemented by utilizing at least one hardware processor;

wherein item (b3) of step (b) comprises:

utilizing another LLM to generate the context information describing said security domain, by LLM-powered analysis of (I) previous Incident Reports, and (II) a knowledgebase that describes vulnerabilities and threats and attacks;

wherein item (b4) of step (b) comprises:

generating organizational context from one or more Active Directory (AD) components of said organization, wherein said organizational context describes at least: (i) users in said organization, and access privileges of each user to each resource of the organization; (ii) devices in said organization, and access privileges of each device to each resource of the organization;

wherein item (b4) of step (b) further comprises:

generating further organizational context from one or more of:
  a Customer Relationship Management (CRM) system of said organization,
  a Supply Chain Management (SCM) system of said organization,
  an Enterprise Resource Planning (ERP) system of said organization;

wherein said further organizational context describes at least one of:
  typical actors of particular customers of the organization;
  typical digital behavior of particular customers of the organization;
  typical actors of particular suppliers of the organization;
  typical digital behavior of particular suppliers of the organization;

wherein item (b4) of step (b) further comprises:

generating additional organizational context that describes Peer Groups among users of said organizations, based on a peer group detection process that checks which users regularly interact with which other users in said organization;

wherein the computerized method comprises:

automatically investigating said Security Alert Message via said LLM, by taking into account at least one of: (i) one or more Alert Messages that were received prior to said Security Alert Message, (ii) one or more Alert Messages that were received subsequent to said Security Alert Message; and determining via LLM-powered deduction that said Security Alert Message is part of a particular Attack Chain;

wherein said LLM comprises an LLM-chain of two or more LLMs;

wherein a first LLM of said LLM-chain generates a Knowledge Graph pertaining to said Security Alert Message and to information that the first LLM determines to be relevant to said Security Alert Message.

2. The computerized method of claim 1, further comprising:

dividing said Knowledge Graph into sub-tree tasks, and allocating each sub-tree task to a different LLM of said LLM-chain.

3. The computerized method of claim 2, further comprising:

collecting a plurality of outputs generated by said plurality of different LLM of said LLM-chain; and feeding said plurality of outputs into a Master LLM that is configured to generate an Incident Report about pertaining to said Security Alert Message.

4. The computerized method of claim 3, further comprising:

inserting into said Incident Report, by at least one LLM of said LLM-chain, a content portion that describes mitigation operations that should be performed to stop or prevent damage from a cyber-attack.

5. The computerized method of claim 4, further comprising:

inserting into said Incident Report, by at least one LLM of said LLM-chain, a machine-readable code portion that triggers one or more Mitigation Units to automatically perform one or more Mitigation Operations that stop or prevent damage from said cyber-attack.

6. A computerized method for automatically generating Incident Reports for an organization that receives incoming alert messages, the computerized method comprising:

(a) receiving an incoming Security Alert Message pertaining to a possible security-related incident;

(b) feeding into a Large Language Model (LLM), at least:
  (b1) content of said Security Alert Message,
  (b2) metadata of said Security Alert Message,
  (b3) context information describing a security domain,
  (b4) organization context information pertaining to users and machines of said organization;

(c) prompting said LLM to automatically investigate said Security Alert Message and to automatically generate a detailed Incident Report pertaining to said Security Alert Message;

wherein the method is implemented by utilizing at least one hardware processor;

wherein item (b3) of step (b) comprises:

utilizing another LLM to generate the context information describing said security domain, by LLM-powered analysis of (I) previous Incident Reports, and (II) a knowledgebase that describes vulnerabilities and threats and attacks;

wherein item (b4) of step (b) comprises:

generating organizational context from one or more Active Directory (AD) components of said organization, wherein said organizational context describes at least: (i) users in said organization, and access privileges of each user to each resource of the organization; (ii) devices in said organization, and access privileges of each device to each resource of the organization;

wherein item (b4) of step (b) further comprises:

generating further organizational context from one or more of:

a Customer Relationship Management (CRM) system of said organization, a Supply Chain Management (SCM) system of said organization, an Enterprise Resource Planning (ERP) system of said organization;

wherein said further organizational context describes at least one of:

typical actors of particular customers of the organization;

typical digital behavior of particular customers of the organization;

typical actors of particular suppliers of the organization;

typical digital behavior of particular suppliers of the organization;

wherein item (b4) of step (b) further comprises:

generating additional organizational context that describes Peer Groups among users of said organizations, based on a peer group detection process that checks which users regularly interact with which other users in said organization;

wherein the computerized method further comprises:

automatically investigating said Security Alert Message via said LLM, by taking into account at least one of: (i) one or more Alert Messages that were received prior to said Security Alert Message, (ii) one or more Alert Messages that were received subsequent to said Security Alert Message; and determining via LLM-powered deduction that said Security Alert Message is part of a particular Attack Chain;

wherein the computerized method further comprises:

(A) collecting documents describing cyber-attacks and attack chains, and documents describing threats and vulnerabilities;

(B) performing tokenization into tokens, of the documents collected in step (A);

(C) creating embeddings from said tokens, based on a particular embedding model;

(D) constructing a Vectorized Dataset from said embeddings; and (E) fine-tuning said LLM, by modifying weights of parameters that said LLM uses, based on said Vectorized Dataset.

7. The computerized method of claim 6, wherein said fine-tuning specifically modifies said LLM to generate relevant and accurate outputs in response to engineered prompts that command said LLM to perform a specific task of Incident Report generation in a specific field of Security Domain.

8. A computerized method of claim 7, for automatically generating Incident Reports for an organization that receives incoming alert messages, the computerized method comprising:

(a) receiving an incoming Security Alert Message pertaining to a possible security-related incident;

(b) feeding into a Large Language Model (LLM), at least:

(b1) content of said Security Alert Message, (b2) metadata of said Security Alert Message, (b3) context information describing a security domain, (b4) organization context information pertaining to users and machines of said organization;

(c) prompting said LLM to automatically investigate said Security Alert Message and to automatically generate a detailed Incident Report pertaining to said Security Alert Message;

wherein the method is implemented by utilizing at least one hardware processor;

wherein item (b3) of step (b) comprises:

utilizing another LLM to generate the context information describing said security domain, by LLM-powered analysis of (I) previous Incident Reports, and (II) a knowledgebase that describes vulnerabilities and threats and attacks;

wherein item (b4) of step (b) comprises:

generating organizational context from one or more Active Directory (AD) components of said organization, wherein said organizational context describes at least: (i) users in said organization, and access privileges of each user to each resource of the organization; (ii) devices in said organization, and access privileges of each device to each resource of the organization;

wherein item (b4) of step (b) further comprises:

generating further organizational context from one or more of:

a Customer Relationship Management (CRM) system of said organization, a Supply Chain Management (SCM) system of said organization, an Enterprise Resource Planning (ERP) system of said organization;

wherein said further organizational context describes at least one of:

typical actors of particular customers of the organization;

typical digital behavior of particular customers of the organization;

typical actors of particular suppliers of the organization;

typical digital behavior of particular suppliers of the organization;

wherein item (b4) of step (b) further comprises:

generating additional organizational context that describes Peer Groups among users of said organizations, based on a peer group detection process that checks which users regularly interact with which other users in said organization;

wherein the computerized method further comprises:

automatically investigating said Security Alert Message via said LLM, by taking into account at least one of: (i) one or more Alert Messages that were received prior to said Security Alert Message, (ii) one or more Alert Messages that were received subsequent to said Security Alert Message; and determining via LLM-powered deduction that said Security Alert Message is part of a particular Attack Chain;

wherein, prior to being prompted to generate said Incident Report, said LLM is fine-tuned based on a Labeled Dataset that was constructed based on embeddings from tokens of tokenized documents in a field of Security Domain.

9. A computerized method for automatically generating Incident Reports for an organization that receives incoming alert messages, the computerized method comprising:

(a) receiving an incoming Security Alert Message pertaining to a possible security-related incident;

(b) feeding into a Large Language Model (LLM) at least:
  - (b1) content of said Security Alert Message,
  - (b2) metadata of said Security Alert Message,
  - (b3) context information describing a security domain,
  - (b4) organization context information pertaining to users and machines of said organization;

(c) prompting said LLM to automatically investigate said Security Alert Message and to automatically generate a detailed Incident Report pertaining to said Security Alert Message;

wherein the method is implemented by utilizing at least one hardware processor;

wherein item (b3) of step (b) comprises:

utilizing another LLM to generate the context information describing said security domain, by LLM-powered analysis of (I) previous Incident Reports, and (II) a knowledgebase that describes vulnerabilities and threats and attacks;

wherein item (b4) of step (b) comprises:

generating organizational context from one or more Active Directory (AD) components of said organization, wherein said organizational context describes at least: (i) users in said organization, and access privileges of each user to each resource of the organization; (ii) devices in said organization, and access privileges of each device to each resource of the organization;

wherein item (b4) of step (b) further comprises:

generating further organizational context from one or more of:
  - a Customer Relationship Management (CRM) system of said organization,
  - a Supply Chain Management (SCM) system of said organization,
  - an Enterprise Resource Planning (ERP) system of said organization;

wherein said further organizational context describes at least one of:

- typical actors of particular customers of the organization;
  - typical digital behavior of particular customers of the organization;
  - typical actors of particular suppliers of the organization;
  - typical digital behavior of particular suppliers of the organization;

wherein item (b4) of step (b) further comprises:

generating additional organizational context that describes Peer Groups among users of said organizations, based on a peer group detection process that checks which users regularly interact with which other users in said organization;

wherein the computerized method further comprises:

automatically investigating said Security Alert Message via said LLM, by taking into account at least one of: (i) one or more Alert Messages that were received prior to said Security Alert Message, (ii) one or more Alert Messages that were received subsequent to said Security Alert Message; and determining via LLM-powered deduction that said Security Alert Message is part of a particular Attack Chain;

wherein the computerized method comprises:

feeding into said LLM (a1) security domain knowledge context, and (a2) organizational context reflecting relations among users and peer groups of users, and (s3) organizational context reflecting permissions of users to access organizational resources;

prompting said LLM to utilize items (a1) and (a2) and (a3) in generating said Incident Report.

10. The computerized method of claim 9, comprising:

utilizing a Query-Generating LLM, to generate specific queries and specific prompts that are estimated to enable generation of said Incident Report based on said Security Alert Message.

* * * * *